US012527692B2

(12) United States Patent
Vogelsang et al.

(10) Patent No.: US 12,527,692 B2
(45) Date of Patent: *Jan. 20, 2026

(54) UV-LASER-BASED SYSTEM FOR REFRACTIVE ERROR CORRECTION, AND CONTACT INTERFACE

(71) Applicant: Carl Zeiss Meditec AG, Jena (DE)

(72) Inventors: Hartmut Vogelsang, Oberweser (DE); Dan Z. Reinstein, London (GB); Wolfgang Kern, Grossostheim (DE); Christian Deutsch, Weimar (DE); Claus Goder, Nuremberg (DE)

(73) Assignee: Carl Zeiss Meditec AG, Jena (DE)

( * ) Notice: Subject to any disclaimer, the term of this patent is extended or adjusted under 35 U.S.C. 154(b) by 440 days.

This patent is subject to a terminal disclaimer.

(21) Appl. No.: 17/999,666

(22) PCT Filed: May 21, 2021

(86) PCT No.: PCT/EP2021/063607
§ 371 (c)(1),
(2) Date: Nov. 22, 2022

(87) PCT Pub. No.: WO2021/239601
PCT Pub. Date: Dec. 2, 2021

(65) Prior Publication Data
US 2023/0210695 A1   Jul. 6, 2023

(30) Foreign Application Priority Data
May 24, 2020  (DE) ..................... 10 2020 206 422.9
Jul. 10, 2020  (DE) ..................... 10 2020 208 679.6

(51) Int. Cl.
A61F 9/009   (2006.01)
A61F 9/008   (2006.01)

(52) U.S. Cl.
CPC ............ A61F 9/009 (2013.01); A61F 9/0084 (2013.01); A61F 2009/00872 (2013.01); A61F 2009/00897 (2013.01)

(58) Field of Classification Search
None
See application file for complete search history.

(56) References Cited

U.S. PATENT DOCUMENTS

| 5,450,144 A | 9/1995 | Ben |
| 9,592,156 B2 | 3/2017 | Huang et al. |

(Continued)

FOREIGN PATENT DOCUMENTS

| DE | 69527076 | 12/2002 |
| DE | 102005040338 | 3/2007 |

(Continued)

OTHER PUBLICATIONS

Zhu et al., Technical Note, Etendue and Optical Throughput Calculations, 2018 Energetiq Technology, Inc. (Year: 2018).*

(Continued)

Primary Examiner — Carl H Layno
Assistant Examiner — Manolis Pahakis
(74) Attorney, Agent, or Firm — DeWitt LLP

(57) ABSTRACT

An ultraviolet laser-based (UVL) laser vision correction (LVC) system, a contact interface and a contact interface system for such a UVL-LVC system. The invention facilitates a coupling and affixation between the patient's eye and the UVL-LVC system by application of a contact interface for the purposes of preventing eye movements when using UVL-LVC systems. The invention includes a UVL-LVC system with a base unit and an application arm which has a contact interface adapter on an application part of the application arm, to which a contact interface is affixable, the contact interface being usable to be to affix a patient's eye (Continued)

to the UVL-LVC system. The contact interface may have a conical wall and a suction ring but not a lens element, and optionally has an access opening or a corresponding contact interface system made of a contact interface adapter and a contact interface.

5 Claims, 9 Drawing Sheets

(56) References Cited

U.S. PATENT DOCUMENTS

| | | | | |
|---|---|---|---|---|
| 9,878,397 | B2* | 1/2018 | Hirata | B23K 26/0648 |
| 10,470,932 | B2 | 11/2019 | Gooding et al. | |
| 11,135,093 | B2* | 10/2021 | Loerner | A61F 9/00825 |
| 2010/0256614 | A1* | 10/2010 | Donitzky | A61F 9/008 |
| | | | | 606/4 |
| 2011/0009851 | A1* | 1/2011 | Donitzky | A61F 9/009 |
| | | | | 606/4 |
| 2012/0283708 | A1* | 11/2012 | Raksi | A61F 9/009 |
| | | | | 606/4 |
| 2013/0041354 | A1* | 2/2013 | Brownell | A61F 9/00836 |
| | | | | 606/4 |
| 2013/0103014 | A1* | 4/2013 | Gooding | A61B 3/0008 |
| | | | | 606/4 |
| 2013/0226157 | A1 | 8/2013 | Huang | |
| 2013/0338649 | A1* | 12/2013 | Hanebuchi | A61F 9/009 |
| | | | | 606/4 |
| 2014/0194860 | A1* | 7/2014 | Dick | A61F 9/0084 |
| | | | | 606/6 |
| 2014/0324029 | A1* | 10/2014 | Rathjen | A61F 9/008 |
| | | | | 606/4 |
| 2014/0324030 | A1* | 10/2014 | Rathjen | A61F 9/008 |
| | | | | 606/4 |
| 2016/0235586 | A1* | 8/2016 | Fu | A61F 9/009 |
| 2016/0331586 | A1* | 11/2016 | Deisinger | A61F 9/009 |
| 2016/0374857 | A1* | 12/2016 | Fu | A61F 9/009 |
| | | | | 606/3 |
| 2017/0056243 | A1 | 3/2017 | Schuele et al. | |
| 2018/0064577 | A1* | 3/2018 | Malek Tabrizi | A61B 3/107 |
| 2021/0315455 | A1* | 10/2021 | Delong | A61B 3/14 |

FOREIGN PATENT DOCUMENTS

| | | |
|---|---|---|
| JP | H06154264 | 3/1994 |
| WO | WO2011003431 | 1/2011 |

OTHER PUBLICATIONS

International Preliminary Report on Patentability and Written Opinion for International Application No. PCT/EP2021/063607, dated Nov. 17, 2022, 9 pages.

International Search Report (English translation) and Written Opinion for International Application No. PCT/EP2021/063607.

* cited by examiner

UV-LASER-BASED SYSTEM FOR REFRACTIVE ERROR CORRECTION, AND CONTACT INTERFACE

RELATED APPLICATIONS

This application is a National Phase entry of PCT Application No. PCT/EP2021/063607 filed May 21, 2021, which application claims the benefit of priority to DE Application No. 10 2020 208 679.6 filed Jul. 10, 2020, and DE Application No. 10 2020 206 422.9 filed May 24, 2020, the entire disclosures of which are incorporated herein by reference.

TECHNICAL FIELD

Embodiments of the present invention relate to ultraviolet laser-based (UVL) laser vision correction (LVC) systems, that is to say systems for vision correction by application of laser radiation, with the correspondingly included treatment laser emitting in the ultraviolet range and an example of said laser beam being an excimer laser or solid-state laser with wavelengths between approximately 193 nm and 213 nm. These systems are typically pulsed systems, that is to say not systems that emit continuous waves. Such UVL-LVC systems are used to process the cornea of a patient's eye starting from its surface or to process a volume under a folded-away surface of the cornea of the patient's eye starting from the exposed surface, in each case by use of photoablation. The invention also relates to corresponding methods for UVL-LVC systems and to a contact interface for such UVL-LVC systems.

BACKGROUND

UVL-LVC systems currently in use, for example the MEL systems by Carl Zeiss Meditec AG, the Amaris systems by Schwind eye-tech solutions GmbH or the Micron systems by Excelsius Medical GmbH, are systems for vision correction that have been successfully employed for a long time. Nevertheless, they have a number of deficiencies or disadvantages, for which solutions are intended to be revealed here.

A rigid laser beam guidance system is provided in current UVL-LVC systems, virtually without exceptions. Although this facilitates safe laser beam guidance, it requires that the patient on a patient couch is moved under a fixed system aperture in x, y, z coordinates by operation of said patient couch until the patient's eye intended to be treated is correctly positioned in relation to the optical axis of the system. An exception is formed by the system described in US 2013/0226157 A1, in which the laser arm, rigid per se, is positioned as a whole over the patient, albeit in a manner which still requires the positioning of the patient by way of the patient couch. However, for safety reasons, the latter frequently requires the patient couches to be electrically and/or mechanically connected to the laser base unit, which in turn requires a system certification and large amounts of space.

Additionally, there is a conventional manual static alignment of the eye in relation to cyclorotation in such UVL-LVC systems, i.e., without an automatic correction with the aid of registration data, by rotating the patient's head on the couch under visual monitoring. As a rule, this is not possible with great accuracy and a rotation of the head of the patient during the treatment is not precluded either, which is critical for the treatment results if there is no automatic cyclorotation correction.

Moreover, contact interfaces for affixing the eye are known in some current UVL-LVC systems. However, in such UVL-LVC systems, for example as described in US 2013/0226157 A1 and U.S. Pat. No. 9,592,156 B2, these are only implemented for eye stabilization purposes and do not adopt a truly active role. Work is carried out entirely without contact interfaces in many systems.

Large working distances between laser exit aperture and eye were realized with the introduction of spot-scanning UVL-LVC systems. This was also implemented against the background of using microkeratomes, which were used with the patient on the patient bed of the system, in order to cut the LASIK flap, that is to say an opening in the cornea that can be folded to one side. Among other things, this also required great working distances. Eye trackers for registering and compensating the eye movements were introduced at a later stage, and hence the eye movements during the ablation, which arose due to an unaffixed eye, were compensated. The overall optical system concept accompanying this—which in principle is very similar in the various systems—may also be considered to be disadvantageous.

Various problems arise in relation to eye tracking during the application thereof. Overall, the registration speed for the eye movement is limited and the adjustment of the scanner mirrors for correcting the pulse coordinate requires a finite amount of time. In the context of the system performance, the response to the eye movement ("response time") is always delayed and hence never exact. In the case of current, fast eye tracker systems (with a repetition rate of approximately 1000 Hz), this is no problem for the lateral correction (x, y shift; "1st and 2nd eye tracking dimension"). However, the currently fastest system already responds to the limitations since the eye tracker speed is even below the limit for the scanning frequency. In a manner of speaking, a prediction about the future movement of the eye is made on the basis of the preceding movement trajectories ("7th eye tracking dimension"). Naturally, this is an oversimplification since eye saccades/nystagmus correspond to statistical movements of the eye in the broadest sense. This also highlights the fact that an increase in the repetition rate is hardly advantageous with current technology, even though this would be of interest for certain applications and in certain ablation timeframes (thermal controlled/mild ablation).

Moreover, purely lateral tracking is a limitation since the rotation of the eye about the z-axis ("dynamic cyclorotation"; "6th eye tracking dimension") and the roll movements about the horizontal and vertical eye axes ("3rd and 4th eye tracking dimension") have to be taken into account. Finally, the distance (z-distance) to the laser exit aperture may also vary, which can likewise be compensated for by appropriate tracking (6th eye tracker dimension).

Despite all technical intricacies and correction options, these systems however are not able to respond exactly to the eye position: The limited quality of the registration and the speed of the registration and correction do not allow this. Normally, the influence on the refractive results is very small and hardly detectable.

However, there are further problems with the eye tracking in the case of uncooperative patients, in the case of whom there are fixation instability, nervousness, cognitive deficits or problems with perceiving the fixation target. Then, the eye surgeons must affix the eyes during the ablation manually by application of a clamp or foam spatula in order to even make ablation possible. This occurs relatively frequently and is due to the fact that the eye movements are guided out of what is known as the (limited) "eye tracker hot zone" and the system must then stop.

In this context, the production of prismatic errors by the eye tracker must also be mentioned. The ablation profiles are not applied in the correct plane, that is to say not to the surface normal, i.e., perpendicular to the visual axis. This may happen if the patient by preference fixates in a largely fixed but "incorrect" direction, that is to say, e.g., permanently looks in a fixed direction that does not correspond to the center of the "fixation cloud" (depending on refractive deficit and treatment duration, the patient can no longer see the fixation target in focus during the operation).

Additionally, eye trackers do not work for all eyes on account of problematic eye color and/or lack of contrast. Percentage range outage rates of the eye tracker occur in practice. All that eye surgeons can then do is decide between terminating the operation and deactivating the eye tracker, which is then accompanied by the risk of an inaccurate correction.

Constant ambient conditions above the operation site cannot be set, or can only be set to a very qualified extent, by current systems.

It is known that the influence of varying ambient conditions, for instance air humidity and changes in the hydration state of the cornea accompanying this, the composition of the air (in the case of evaporation of solvents for example) or the temperature, on the refractive results may be significant. It is also known to be advantageous to ensure that the hydration state of the cornea is maintained during the ablation, or to ensure that drying out of said cornea is avoided. A distinction has to be made between two effects for the hydration: a) the physiological differences in the hydration of the cornea as a distribution over various patients, and b) the maintenance of the hydration during the ablation itself. Both influences lead to an increased variation in the refractive result (for example via an increased variation in the "attempted vs. achieved" prediction). The literature contains many investigations in this respect. Accordingly, the influence of the hydration of the cornea is significant in particular.

A further, very important factor that influences the refractive results is related to the amount and accumulation of ablation products ("debris") over the ablated cornea, that is to say the operation site. It is sufficiently well known that the radiated-in UV ablation pulses are absorbed and scattered in the debris. This uncontrollably modifies the effective pulse fluence, which decisively controls the ablation process. This may lead to significant fluence deviations in the sequence of the ablation pulses. By way of example, there is the risk of central steepening arising in the cornea post surgery in the case of myopia treatments (central islands). Therefore, current systems usually have aspiration structures or a combined air supply and aspiration structures for the debris. However, truly effective removal of the debris is only implementable to a limited extent in practice as a result of the large distance from the supply and removal lines. In principle, this would require a replacement of the entire air volume above the cornea to be treated between successive pulses in the case of pulse repetition rates between 500 Hz and 1000 Hz. As a worst-case scenario, this may lead to "skew" ablations and hence, for example, to induced coma or SIA (surgically induced astigmatism)—especially in the case of non-optimal or non-directed aspiration of the ablation products.

Moreover, there is the risk of corneal dehydration in the case of systems which additionally supply air. This can likewise only be partly prevented. Overall, the operation site cannot be decoupled from the remaining operative surroundings (e.g., airflows in the room) as a result of the open arrangement of current systems either.

The sterile and secure placement of the flap is of extraordinary importance for a LASIK procedure. Typically, a flap is only 100 μm thick and, following the LASIK incision, only fastened to the cornea by way of a very narrow "hinge". Maintaining the hydration of the flap is very important for pathological reasons and also for maintaining the shape of the flap since dehydrated flaps shrink within seconds. Following the treatment, a shrunken flap no longer "fits" well into the stromal bed (which naturally is also due to the change in shape of the stromal surface as a result of the ablation), which may in turn lead to postsurgical complications (e.g., epithelial ingrowth). Where possible, flaps should not be bent, pulled or otherwise stressed either. Hence, experts these days hardly still use the "calzone technique" that was employed in the past. Moreover, it is imperative to avoid the flap coming to rest in possibly non-sterile regions of the eye. Despite the sterile preparation of the eye, this may nevertheless occur, for example as a result of the tear film or contact with non-sterile parts of the lids.

In want of a solution that is integrated in the current systems, some users cut their own flap repositories from sterile foam spatulas (or similar materials), which are then moistened and serve as safe and sterile rest for the sensitive flap. Thus, a solution is sought after in order to put an end to this situation.

On account of the relatively large working distances Δ of existing UVL-LVC systems, there is hardly a difference there in the focusing plane. Therefore, these UVL-LVC systems can be considered to be virtually telecentric on the image side. In the case of conventional UVL-LVC systems, the rays are therefore incident on the cornea at a significant angle since the typical radius of curvature RC of the human eye is approximately 7.86 mm. The working distance Δ of typically 250 mm is also relatively large for these systems (actually this means the distance of the equipment exit aperture contour from the eye, that is to say not directly the variable Δ itself). This also leads to the optical acceptance angle for the return of corneal reflections into the optical system being very small, leading to additional limitations of current systems.

Now, the disadvantages of the commercially available systems are described, which result largely directly from the optical concepts and the geometry of the ablation resulting therefrom.

As a result of the oblique incidence of the rays on the cornea, there are losses in the fluence, that is to say the energy density of the laser pulse, which is decisive for the ablation, in all known systems. In particular, two effects must be considered here: The losses from deviations of the pulse ablation footprint as a result of the local geometry of the cornea at the location of the ablation pulse ("geometry factor") and the Fresnel losses when radiating light at interfaces with different refractive indices (air, cornea), which can be calculated using the Fresnel equations. These effects are sufficiently well known and described.

The pulse ablation shape (corresponds to the ablation-effective fluence distribution of the radiated-in ablation laser pulse in a plane perpendicular to the direction of incidence) is deformed by the geometry of the irradiation of the cornea to form the "pulse ablation footprint on cornea", and hence the fluence distribution changes vis-à-vis the radiated-in pulse ablation shape.

The Fresnel losses can be calculated with the aid of the Fresnel equations with knowledge of the refractive indices of the air and cornea (or stroma) and the angles of incidence. The polarization of the light also needs to be taken into account.

On account of the relatively large working distance of known UVL-LVC systems from the patient's eye, it is difficult to impossible to use reflections from the cornea of the patient's eye for analysis purposes, which as a consequence makes a centration difficult as well. The influence of an inaccurate centration is known and discussed multiple times in the literature. The "common" argument that centration errors, that is to say deviations of the ablation center from the target positions on the cornea, as are typically given by the "ophthalmic pole" for centration on the visual axis and as are referred to as decentrations below, have no influence on spherical corrections is physically true only in certain cases, for example spherical corrections on spherical corneas. However, the visual physiology, inter alia, is not considered in this case. As a rule, decentrations will lead to a shift in the physiological visual axis. When processing the visual impression in the brain, the eye is "rotated" by the eye muscles such that the light continues to fall on the point of sharpest vision, which in principle compensates the prismatic offset ("tip/tilt"). This may lead to problems in the case of binocular vision (stereopsis), for example, which problems are known from investigations in relation to poorly centrated spectacle lenses, for example.

At the latest in the case of aspherical corrections on ellipsotoric corneas, which corresponds to the real, actual scenario, a decentration also leads purely physically to a non-attainment of the sought-after correction.

There is also no need to explain further that decentrations have a significant influence on the results of "customized ablation", as this leads to the induction of higher aberrations ("night vision complaints", etc.) and hence also to an influence on the refractive result. Hence, a centration that is as exact as possible is the absolute basic precondition for a good result in the case of both topography and wavefront corrections.

Aberrations (or optical modes) couple under decentration. As a result of sphere and cylinder coupling to higher-order aberrations (coma, spherical aberration, higher-order astigmatisms), including those occurring in natural (aspherical) eyes, decentrations in real eyes are critical, even in the case of pure spherocylindrical corrections. By way of example, in the case of a decentration, coma couples to astigmatism and defocus or spherical aberration couples to coma, astigmatism and defocus. A few examples should be provided here, which initially only reveal the effects for primary aberrations (up to 4th order). The calculations follow from the coordinate transformation of optical modes:

A shift of 0.25 µm with coma $Z(3,1)$ by 0.3 mm leads to a defocus of approximately $-\frac{1}{8}$ dpt.

A shift of 0.25 µm with coma $Z(3,1)$ by 0.3 mm (horizontal/vertical) leads to a cardinal astigmatism $(Z(2,2)/(Z(2,-2))$ of $\frac{1}{8}$ dpt.

A shift of 0.5 µm with coma $Z(3,1)$ by 0.5 mm leads to a defocus of approximately $-0.3$ dpt.

A shift of 0.4 µm with coma $Z(3,1)$ by 0.5 mm (horizontal/vertical) leads to a cardinal astigmatism $(Z(2,2)/(Z(2,-2))$ of 0.3 dpt.

A shift of 0.6 µm with spherical aberration $Z(4,0)$ by 0.4 mm leads to a defocus of approximately $-\frac{1}{8}$ dpt.

A shift of 0.6 µm with spherical aberration $Z(4,0)$ by 0.4 mm (horizontal/vertical) leads to a cardinal astigmatism $(Z(2,2)/(Z(2,-2))$ of approximately $\frac{1}{8}$ dpt.

Until now, only optical modes manifesting themselves in ablation profiles in the optical zone were considered. The transition zones have not yet been mentioned. However, in this context decentrations also mean that transition zones may reach into the optically active zone, especially in the case of hyperopia corrections. This then leads to disturbances in the case of mesopic to scotopic light conditions ("night vision complaints post surgery"; this does not refer to night myopia), and hence to patient dissatisfaction.

Pupil centrations (centration in relation to the CSC, "corneal sighting center") can be brought about well and reliably in refractive surgery by application of eye tracking systems ("eye tracker") as integrated pupil recognition. However, this type of centration is not the preferred choice since it has in the meantime been settled in the art that a centration in relation to the ophthalmic pole (visual axis, coaxially sighted corneal light reflex, "CSCLR" condition, see below) would be correct. Experience has shown that small and medium myopia corrections are very uncritical in this case. Relatively large astigmatisms and myopia corrections and, in particular, hyperopia corrections are more difficult. This is because hyperopic eyes are typically characterized by a non-negligible angle between the pupil axis and the visual axis ("angle kappa"). In this case, corneal sighting center and ophthalmic pole are no longer sufficiently close together, leading to a difference between "angle lambda" and "angle kappa". Moreover, the pupil and the pupil center is not a fixed marking. Both vary with the lighting conditions.

A centration on the visual axis is implemented in the case of current laser systems by searching for the first Purkinje image of the fixation laser ("target"). Under patient fixation, the recommended CSCLR condition is met when the Purkinje image comes into the center of the system optical unit and the optical system axis and the visual axis become coaxial. Finding this reflection is non-trivial as a result of the optical geometry of current systems, with very small acceptance angles for the entrance of the reflection into the optical beam path as described above. This is made even more difficult in the case of less cooperative patients, for example who exhibit weak fixation, since the reflection then continually disappears. Moreover, the "parallax error" of the surgical microscope, that is to say different directions for the reflection in the right and left observer eye as a result of the binocular arrangement, makes a correct alignment more difficult.

There is no automatic centration in accordance with CSCLR by way of Purkinje images, and also no prospect thereof, in current systems as a result of the aforementioned "disadvantageous" optical geometry of current systems. As it is carried out reliably and automatically by the systems, in contrast to CSCLR centration by use of Purkinje images, this is probably one of the reasons why the pupil centration, despite the problems accompanying this, is currently preferred by many users.

A manual centration on the vertex, which generally represents a reference center for the topography, by entering displacement coordinates is frequently carried out for topography-guided corrections, but also in the case of standard spherocylindrical corrections. The latter is possible since, in the case of normal eyes, the positions of the CV ("corneal vertex", that is to say the intersection point of the keratometric axis on the cornea under patient fixation) with the ophthalmic pole, that is to say the visual axis, are sufficiently close together. This in turn is due to the fact that the center of curvature of the cornea approximately coincides with the second image-side optical node of the eye (cf. Gullstrand, Liou-Brennan eye models). An automated centration with respect to the vertex is not found currently. The user frequently shifts the treatment center manually purely on the basis of the visual comparison with a topography measurement. Or they enter displacement coordinates into the system, which are generally specified in relation to the pupil center (CSC) and, for example, are taken from a topography measurement. A problem in both cases is that the pupil diameter during the topography measurement does not correspond to the pupil diameter under the laser on account of differences in lighting. The frequently arising shift of the pupil center with the pupil size then leads to a non-optimal centration as the corneal vertex has not been determined correctly.

Current UVL-LVC systems offer no method of tomographic alignment of the anterior chamber and the tomographic centration. This may be important for example in the case of corneal irregularities (e.g., caused by traumas or brief swelling of the corneal surface as a result of bubbles following femtosecond laser flap generation), which lead to the corneal vertex and/or the Purkinje image not being found correctly or, expressed differently, a position being identified as the vertex which does not correspond to the normal physiological vertex position. The pure "surface information" from the cornea is then not suitable, or not sufficiently well suitable, for a determination of the optimal centration.

SUMMARY OF THE INVENTION

Example embodiments of the present invention describe apparatuses and a method which address the aforementioned problems of currently used UVL-LVC systems. In particular, to prevent eye movements when UVL-LVC systems, even fast UVL-LVC systems, are used, example embodiments of the invention propose coupling and affixment between the patient's eye and the UVL-LVC system by application of a contact interface. In this case, this contact interface is intended to solve the above-described specific problems of a UVL-LVC system, which arise from the use in the ablation of a cornea of a patient's eye and which have led in actual UVL-LVC systems according to the prior art that have been sold in great numbers to a solution without the use of a contact interface in most cases.

Example embodiments include a UV laser-based system for vision correction (UVL-LVC system), a contact interface and a contact interface system as described below.

A UV laser-based system according to the invention for vision correction (UVL-LVC system) comprises both a base unit and an application arm with, at its distal end, an application part with a laser exit aperture, through which a treatment laser beam emerges from the UVL-LVC system in order to process the cornea of a patient's eye. This is implemented by application of a contact interface used to couple, and as a rule to affix, the patient's eye to the UVL-LVC system and, in particular, to the laser exit aperture for the treatment laser beam in the application part at the distal end of the application arm.

To this end, a contact interface adapter is arranged on the application part, the axis of said contact interface adapter running coaxially with the optical axis of the application part at the latter's laser exit aperture. The contact interface adapter is configured to accommodate a contact interface.

The UVL-LVC system furthermore comprises a UV laser source which emits for example pulsed laser radiation in the UV range. By way of example, this can be an excimer laser or a solid-state laser with wavelengths between approximately 193 nm and 213 nm. Moreover, the UVL-LVC system comprises a scanning system for at least lateral scanning of the laser radiation in the x- and y-directions and optionally also for scanning in the z-direction, and an imaging optical unit for focusing (at least in terms of its lateral extent) the for example pulsed laser radiation on the cornea of a patient's eye. This leads to a photoablation process on the cornea.

In this context, focusing of the laser radiation means that the lateral extent of said laser radiation is restricted significantly by way of an appropriate optical unit such that a cross section through this laser radiation at a location where the patient's eye would be during use is very small, and even collapses to a point. However, in the z-direction, that is to say parallel to the laser radiation, this "focus" may extend over a broad region. As a rule, point-accurate focusing is not required in this case since corresponding UV lasers act on a surface of eye tissue to be treated and, for instance, do not penetrate the tissue in order to only become active in lower lying layers. Thus, eye tissue is ablated "from the top, that is to say from the corneal surface, downward (further into the eye)"—with certain treatments first of all containing the implementation of a flap incision to this end, by use of which tissue, that is to say the upper part of the cornea of the patient's eye which should not be treated and which should be placed back on the treated part again following the treatment, is separated such that this flap can be folded to one side. This is implemented by hand in many cases but can also be brought about using a different laser, for example a femtosecond laser.

Not least, the UVL-LVC system comprises a control unit for controlling all units of this system, in particular of the UV laser source, of the scanning system and movable parts of the imaging optical unit, and, moreover, also for controlling movable parts of the application arm, and for positioning the contact interface. The control unit can be designed as a central control unit, or else be assembled from a plurality of partial units which are connected to one another. A specific planning unit for planning the operation may also be part of the control unit.

In this case, the contact interface adapter is configured to accommodate a contact interface such that the contact interface is rotatable and affixable as desired in relation to the contact interface adapter.

Ideally, the contact interface adapter has a floating mount in the application part of the application arm, which is for example an articulated arm, in this case. As a result, moments of high pressure load can be absorbed by use of a contact interface while a patient's eye is coupled to the UVL-LVC system.

Moreover, a few further aspects of the UVL-LVC system according to the invention with an application arm are intended to be described here.

The application arm is for example configured such that a tilt vis-à-vis the horizontal alignment of the handpiece is not possible. To this end, it operates according to the SCARA (selective compliance assembly robot arm) principle. Thus, the system has a rigid construction in relation to possible tilts. The alignment of the eye is decisive in this case. The latter arises from the centration of the patient's eye under the contact interface until the moment of suction.

Thus, the application arm of the UVL-LVC system is for example an articulated arm which, however, can substantially only be moved in the xy-directions, albeit with all freedoms in respect of its lateral movement.

To be able to appropriately track the pressure and also be able to introduce optionally automatic countermeasures, optionally also manual countermeasures, in the case of an emergency, an example UVL-LVC system according to the invention comprises a pressure sensor and/or a position encoder between the contact interface adapter and the application part.

It is furthermore advantageous if the UVL-LVC system according to the invention comprises an imaging optical unit comprising a microscope optical unit for focusing the for example pulsed laser radiation on the cornea of a patient's eye, the optical opening of which is designed such that an acceptance angle $\chi_{Max}$ for reflections detectable by the UVL-LVC system of greater than 15°, for example greater than 25° and in another example greater than or equal to 370 is achievable. A concept of a UVL-LVC system in which the patient's eye is affixed to the UVL-LVC system by application of a contact interface in order to effectively counteract eye movements and misalignments of the patient's eye during the treatment advantageously operates with a smaller distance between the patient's eye and the laser exit aperture of the UVL-LVC system. Therefore, such example opening angles are preferred so that there is a corresponding visibility over the entire region of the cornea of the patient's eye to be treated.

For the aforementioned reasons, it is advantageous if the optical opening of the UVL-LVC system according to the invention is greater than 50 mm, for example greater than or equal to 60 mm, and a working distance of the UVL-LVC system is less than 50 mm, for example less than or equal to 40 mm.

To protect the optical unit of the UVL-LVC system according to the invention from contamination, an example embodiment of the UVL-LVC system moreover comprises a transparent protection element, in particular a protection glass, behind the laser exit aperture in the application part of the application arm.

A contact interface according to the invention for positioning and affixing a patient's eye on a UVL-LVC system comprises a conical wall and a suction ring for suction contact with a patient's eye by application of negative pressure but does not comprise any optical element, in particular does not comprise any lens element.

Contact interfaces, as are used for work with lasers that separate tissue by application of photodisruption (i.e., femtosecond lasers for example) and to this end comprise a contact glass placed on a broad surface of the cornea of the patient's eye in the region intended to be processed, are a hindrance here: After all, the UVL-LVC laser processing should be implemented by application of photoablation on a surface of the cornea or else on a face which, after a flap has been folded away as described above, forms a (sur)face to be processed. Hence, the contact interface is designed so that this surface to be processed remains free and accessible. Hence, suction against the patient's eye is only implemented by way of a suction ring, that is to say consequently by way of a circumferential "channel" that is continuous or else interrupted in segment-like fashion.

Moreover, the conical wall of a particular example contact interface according to the invention has an access opening which enables access to the patient's eye while the latter is affixed to a UVL-LVC system. Hence, a manual manipulation (for example, preparing a flap and folding the latter to one side, and folding a flap back following the treatment) is easily possible in the affixed state of the patient's eye, that is to say without the patient's eye having to be separated from the UVL-LVC system, both before a treatment with the UVL-LVC system and following such a treatment.

A configuration in which the contact interface according to the invention comprises an access opening and additionally also a cover element for reversible sealability of the access opening is particularly preferred. Should there be a manual manipulation of the patient's eye, the cover element is in a position in which the access opening is opened up to this end. However, should there be a treatment with the UVL-LVC system, the cover element is in a position in which it covers the access opening. As a result, it is possible to obtain particularly homogeneous process conditions because the access opening then does not represent a possible disturbance in relation to the gas flows.

In such an example configuration of the contact interface according to the invention, the cover element is rotatably arranged on an outer side of the conical wall, for example by operation of a clip mechanism, such that the access opening is at least largely covered in a first state and largely open in a second state as a result of a rotation of the cover element.

A particular example configuration of the contact interface according to the invention has a flap repository at its end facing the patient's eye. This permits a controlled placement of the aforementioned flap that should be folded to one side for a treatment, and so the flap no longer needs to be placed in disorderly fashion. A disorderly placement or "fold to one side" harbors the risk of a tear and possibly leads to problems with covering the treated region within the scope of the folding back process following the treatment.

In a further advantageous embodiment, the contact interface according to the invention furthermore comprises a contact interface adapter intermediate wall, which for example extends at a constant distance from the conical wall of the contact interface and is configured to be affixed to a contact interface adapter of the UVL-LVC system. Such a contact interface adapter intermediate wall protects the contact interface adapter, which of course is arranged securely (for example in floating fashion) at an exit aperture in the application part of an application arm in the UVL-LVC system, from the deposition of waste products arising during the treatment. The contact interface adapter intermediate wall—as a part of the contact interface but which is only optionally securely connected to the conical wall of said contact interface—is then disposed of after each treatment, that is to say it is a so-called "disposable", i.e., a part conceived for single use.

In the case of a contact interface according to the invention with a contact interface adapter intermediate wall, it is preferred in turn if this contact interface adapter intermediate wall is adhesively bonded by use of edge elements to the conical wall of the contact interface at the upper side thereof distant from the patient's eye. In this case, it is then only necessary for one part to be manipulated when the patient's eye is intended to be affixed to the UVL-LVC system, for example rendering possible a manipulation using only one hand.

Alternatively, however, work can also be carried out with two parts that are separate from one another and are only brought into contact with one another for the affixment of the patient's eye to the UVL-LVC system and which are then kept together by application of, e.g., a vacuum or negative pressure between corresponding edge elements of the conical wall and the contact interface adapter intermediate wall.

A contact interface system according to the invention for positioning and affixing a patient's eye on a UVL-LVC system comprises a contact interface adapter and an above-described contact interface according to the invention, the contact interface adapter being arrangeable on an application part of the application arm of the UVL-LVC system with a laser exit aperture such that its axis runs coaxially with the optical axis of the application part at the latter's laser exit aperture, and the contact interface being able to be placed on a patient's eye and being affixable there, and the contact interface being rotatable and affixable as desired in relation to the contact interface adapter.

For example, such a contact interface system according to the invention comprises a connector for establishing a connection to a pump for producing the negative pressure in the suction ring for an affixment to the patient's eye, said connector being arranged on the contact interface, and furthermore comprises a connector for aspirating air or any other gas from its interior, said connector for example being arranged on the contact interface.

Furthermore, it is preferable, for example, for the contact interface system according to the invention to comprise a connector for establishing a connection to a pump for producing the negative pressure for affixing the contact interface on the contact interface adapter, said connector for example being arranged on the contact interface adapter, or else a mechanical rotation and affixment system for rotating and affixing the contact interface on the contact interface adapter.

This ensures simple connections between contact interface and contact interface adapter for the purposes of affixing the contact interface to the contact interface adapter.

It is also advantageous if the contact interface system according to the invention comprises a connector for supplying air or any other gas, said connector for example being arranged on the contact interface adapter, this supply for example being configured to ensure cleaning, sterilizing, cooling and/or hydrating of the air or the other gas in the process.

Moreover, it is advantageous if the contact interface system according to the invention comprises a contact interface with a first conical wall with a first upper and a first lower diameter and a contact interface adapter with a second conical wall with a second upper and a second lower diameter, the second diameters being smaller than the first diameters such that both walls extend substantially parallel to one another. In this case, a supply or aspiration of the air or the other gas centrally through the second conical wall of the contact interface adapter and an aspiration or supply of the air or the other gas between the first and second conical wall is set up, for example in such a way that a cycloidal flow profile arises when the contact interface is affixed to the UVL-LVC system and the patient's eye.

Thus, if the air or the other gas is supplied centrally, then the latter is supplied into the cone formed by the contact interface adapter from above; this protects the laser exit aperture and, in particular, the optical unit from depositions of process waste products since the latter is moved away from the optical unit by the direction of the gas flow and is aspirated between the first and the second conical wall. If the gas flow is chosen in the other direction, there is a certain risk of deposition of process waste products, which must then be counteracted by other means (see below). However, a corresponding moisture regulation of the patient's eye is easier in this case.

In both cases, the intention is to generate a type of mini cyclone in the interior of the contact interface adapter, by application of which the process waste products can be effectively removed.

In this case, a contact interface system according to the invention, in particular a contact interface system in the interior of which a mini cyclone is intended to be generated, is for example preferred, the supply of the air or any other gas of which has a pressurization of more than 10 mbar, but for example more than 20 mbar.

An alternative embodiment of the contact interface system according to the invention contains two opposing chamber partition walls which extend substantially over the entire height of the contact interface between the conical wall and the contact interface adapter intermediate wall or contact interface adapter, said chamber partition walls dividing the space between the conical wall and the contact interface adapter intermediate wall or contact interface adapter into two chambers, the first chamber comprising a connector for supplying air or any other gas and the second chamber comprising a connector for aspirating air or any other gas, with the contact interface adapter intermediate wall or the contact interface adapter for example having perforations over at least a portion of the area thereof. Such a system enables airflows or gas flows which move substantially parallel to the surface of the patient's eye (at least centrally over the cornea of the patient's eye to be processed), with the first chamber having an inlet function and the second chamber having an outlet function. As a result of appropriate perforations (depending on embodiment) in the contact interface adapter intermediate wall or in the contact interface adapter, the airflows or gas flows can be further parallelized or homogenized.

In such a contact interface system according to the invention, in which parallel airflows or gas flows are intended to be established, there is particular preference for example for perforations on the contact interface adapter intermediate wall or contact interface adapter which are adjusted in number and diameter such that the airflow or gas flow in the contact interface system is modelable, in particular having stronger and weaker airflow regions.

In this context, it is particularly advantageous in such a contact interface system according to the invention if flow speeds perpendicular to the plume propagation of greater than 2.5 m/s, for example greater than 5 m/s and in another example greater than 10 m/s are able to be rendered possible in a zone closest to the eye. In this variant, this serves for an effective removal of process waste products.

In a particular configuration, the contact interface system according to the invention furthermore comprises a transparent protection element for the equipment optical unit, more particularly a protection glass, which is arranged in the contact interface adapter such that the laser radiation emitted by the UVL-LVC system can pass through without hindrance. Such a transparent protection element provides additional protection against deposition of process waste products on the optical unit of the UVL-LVC system, in particular on the latter's last optical element.

A UVL-LVC system according to the invention as described above is configured in particular to accommodate a contact interface according to the invention, likewise described above, and/or said UVL-LVC system comprises an above-described contact interface system.

BRIEF DESCRIPTION OF THE DRAWINGS

The present invention will now be explained on the basis of example embodiments. In the drawings.

DETAILED DESCRIPTION

Figure 1:
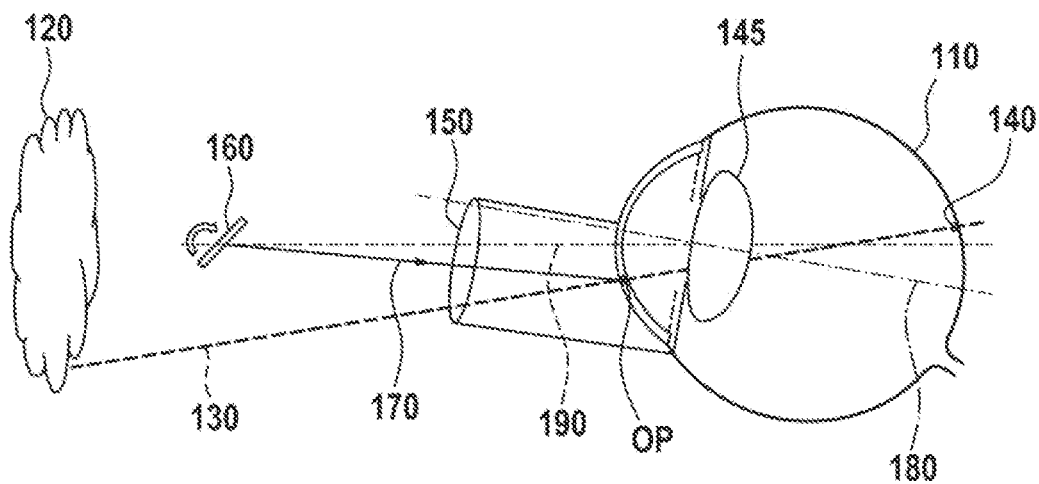
FIG. 1 depicts a schematic representation of the geometry on the eye when the patient fixates in a wrong direction.

FIG. 1 shows a schematic representation of the geometry on the eye 110 when the patient fixates in a "wrong" direction. In the example shown, the eye 110 of the patient is not gazing at the center of a fixation cloud 120. In this case, an ablation profile 150 is not applied correctly along the necessary treatment axis, for example along a visual axis 130. The visual axis 130 is defined by the ophthalmic pole OP and the fixation of the patient. Hence, the ablation profile 150 is not applied at right angles to the visual axis 130. The relationships are depicted with much exaggeration in FIG. 1. FIG. 1 furthermore shows a fovea 140 of the eye, a crystalline lens 145, a scanner 160 (rotatable, represented by the bent arrow) of the UVL-LVC system for the lateral deflection of laser radiation 170, an axis of symmetry 180 of the eye 110 and an optical axis 190 of the UVL-LVC system.

An ablation profile 150 is not applied in the correct plane (i.e., not on the surface normal, that is to say perpendicular to the visual axis 130) as a result of the "wrong" fixation of the patient's eye 110. This may occur if the patient by preference fixates in a largely fixed, but "wrong" direction, that is to say for example permanently gazes in a fixed direction that does not correspond to the center of the "fixation cloud" 120. This may occur should the patient, depending on refractive deficit and treatment duration, no longer be able to see the fixation target in focus during the operation. A prismatic correction error (tip/tilt) arises on account of the wrong fixation.

Figure 2:
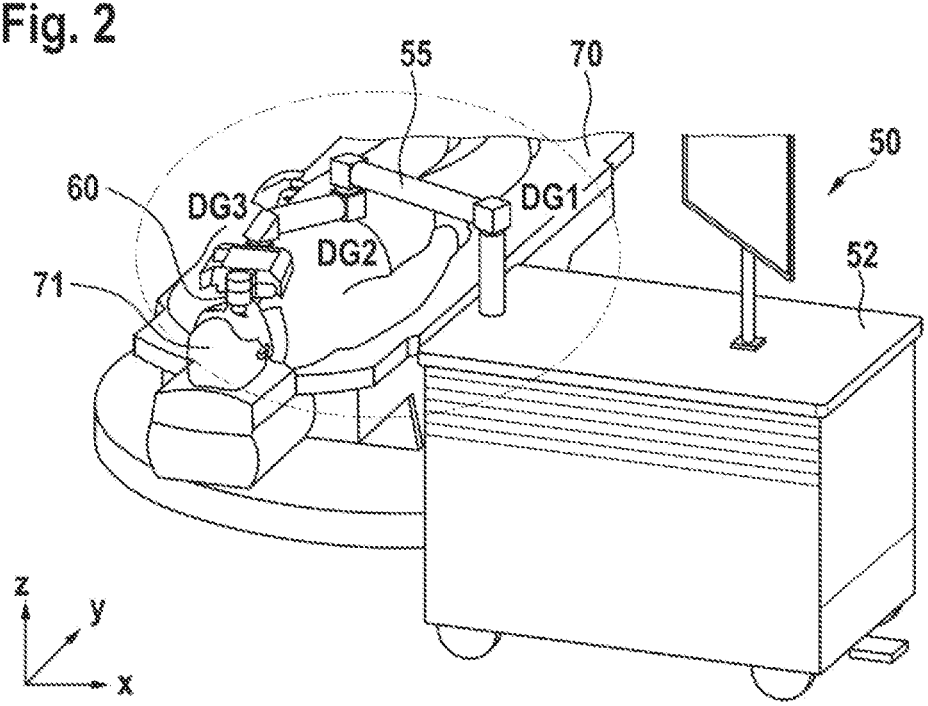
FIG. 2 depicts an example of a basic structure of a UVL-LVC system according to the invention with an application arm.

FIG. 2 shows an example of a basic structure of a UVL-LVC system 50 according to the invention with an application arm 55, in this case an articulated arm with three rotary joints DG1, DG2, DG3 in a SCARA arrangement for xy-movement. The height adjustment (z) of the articulated (laser) arm is implemented by way of an adjustment of the entire laser system (spindle, scissors table, . . . ) and is not shown here. The application part 60 with laser exit aperture 65 is located at the distal end of the articulated arm.

The laser head for the ablation laser used here, power supplies, etc. are housed in the mobile laser base unit. Starting from the laser source, the treatment laser beam is guided to the patient's eye 110 via deflection mirrors, inter alia in the rotary joints DG1 to DG3 (by application of a suitable optical unit).

Moreover, placement of the contact interface 10 attached to the application part 60 (application part) on the patient's eye 110 should be assisted, for example, by a horizontal strip projection (e.g., by scanning a suitable laser). The application part 60 with the contact interface 10 can be aligned with respect to the patient's eye 110—e.g., with respect to the corners of the eye—under projected strip control by rotating the application part 60 itself (rotary joint DG3) in order to avoid a static cyclorotation of the patient's eye 110 with respect to the system 50. This is an advantage over all UVL-LVC systems 50 according to the prior art. A cyclorotation correction and the avoidance of the risk of the rotation of the head of the patient during the treatment is implemented in the UVL-LVC system 50 according to the invention by coupling and affixing the patient's eye 110 to the contact interface 10.

In an example embodiment, use is made of registration data from diagnostic equipment which enables an automatic cyclorotation correction. To this end, use is made of a reference image obtained following contact interface adaptation, said reference image being compared to the registration data from the diagnosis in order to calculate a transformation of the pulse coordinates therewith for compensating cyclorotation, in a manner similar to UV laser-based vision correction in other systems.

Figure 3:
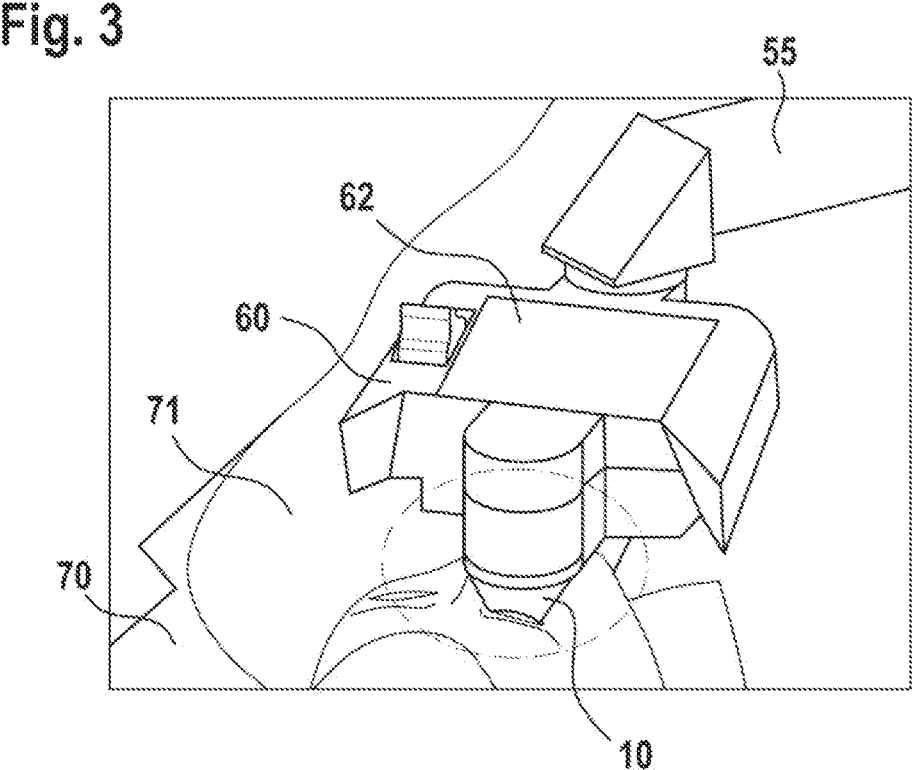
FIG. 3 depicts a magnified section of the UVL-LVC system according to the invention: application part at the distal end of the application arm with contact interface.

FIG. 3 shows a magnified section of the UVL-LVC system 50 according to the invention with an application part 60 at the distal end of the application arm 55 with contact interface 10 with operating units for adjusting the height (z), lighting, control elements for the contact interface 10 (for the aspiration of the ablation products, suction against the patient's eye, etc.). The operating elements have not been depicted in full. A display 62 for simple representation and operation is an optional component. The contact interface 10 itself is adapted by the user (surgeon) by way of an appropriate interface.

The contact interface 10 is of decisive importance for the application of the UVL-LVC system 50 according to the invention. With it, several problems are solved or improvements are realized in relation to UVL-LVC systems according to the prior art.

Figure 4:
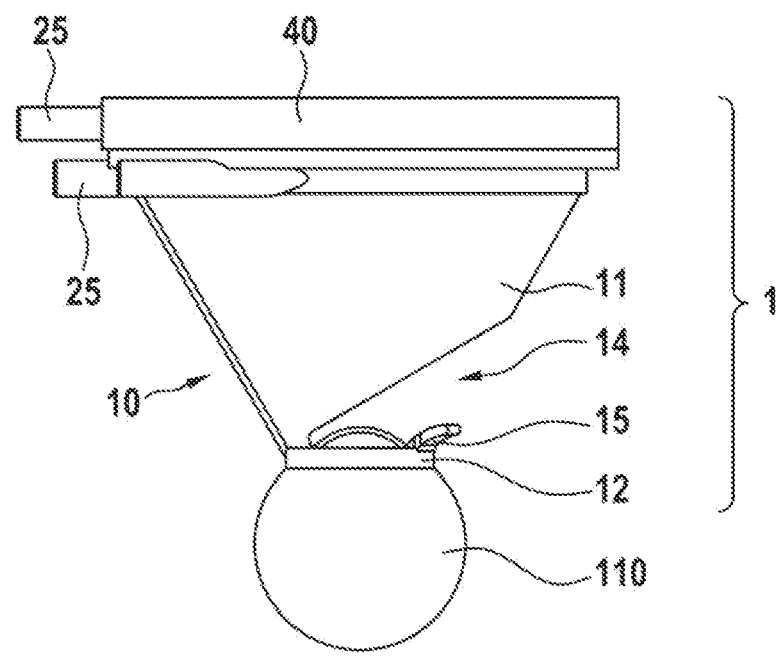
FIG. 4 depicts a first example embodiment of the contact interface system according to the invention.

Initially, the intention is to briefly explain the basic aspects of the contact interface 10 and of the entire contact interface system 1 of the UVL-LVC system according to the invention; in this respect, see FIG. 4, which shows a first example embodiment of the contact interface system 1 according to the invention.

The contact interface 10 is constructed in conical form; it has a conical wall 11. It is adapted by the user and affixed over a contact interface adapter 40 directly below the optical exit, the so-called laser exit aperture 65, of the application part 60.

By preference, the actual contact interface 10 to this end is for example used as a sterile disposable for example made of a biocompatible plastic (part depicted in blue). It is fastened to the contact interface adapter 40 of the application part 60 of the UVL-LVC system 50 according to the invention by the user prior to the treatment. The contact interface 10 is equipped with a suction ring 12 such that the affixment of the patient's eye 110 is realized in the case of negative pressure. A LASIK flap can be deposited on a flap repository 15 provided to this end.

In the process, the contact interface 10 remains rotatable for the purposes of establishing the flap-hinge position. The suction ring 12 enables the secure connection of the contact interface 10 to the patient's eye 110 and a possible LASIK flap can be positioned on the flap repository 15.

The flap manipulation (releasing, folding) is implemented by way of an access opening 14 in the contact interface 10, which enables access for instruments.

The height of the contact interface 10 for example is in the range from approximately 20 to 40 mm (corresponds to the eye distance of the patient's eye 110 from the contact interface adapter 40). It arises from the optical overall concept of the UVL-LVC system 50 according to the invention with a small working distance from the patient's eye 110.

In this context, the induction of prismatic errors by the eye tracker must also be mentioned (see FIG. 1). The ablation profiles are not applied in the correct plane, that is to say not to the surface normal, i.e., perpendicular to the visual axis. This may happen if the patient by preference fixates in a largely fixed but "incorrect" direction with their eye 110, that is to say, e.g., permanently looks in a fixed direction that does not correspond to the center of the "fixation cloud" 120 (depending on refractive deficit and treatment duration, the patient can no longer see the fixation target in focus during the operation).

Something else happens if the patient's eye 110 is fixated at the UVL-LVC system 50 according to the invention by the contact interface 10. Hence, eye movements no longer occur and, in particular, this also dispenses with the necessity of an eye tracker (and hence also, in comparison with current systems, the required dynamic cyclorotation correction). In contrast to systems according to the prior art, UVL-LVC systems 50 according to the invention can even compensate problems in the case of moderate slippage of the contact interface 10, which for example would be accompanied by an incorrect correction (displacement of the treatment center, cyclorotation of the patient's eye 110, etc.).

Moreover, the above-described problems caused by the ambient conditions are removed, or their consequences are at least moderated, by the contact interface 10 according to the invention in conjunction with the UVL-LVC system 50 according to the invention since a direct airflow on the eye and hence dehydration can be avoided, debris (i.e., the process waste products) can be effectively and controllably removed, and hydrated, temperature-controlled and cleaned air can be supplied. In the process, the operation site is additionally largely shielded from the ambient conditions in the operation surroundings (e.g., from directed airflows due to air-conditioning equipment in the operating theaters) by the conical contact interface 10 (disposable). Optionally, the contact interface 10 can also be configured as a lid retractor and/or comprise integrated tear film aspiration for assisting with constant hydration.

Overall, this leads to improved refractive results, which are revealed in particular by a reduction in the variation of the predictability ("attempted vs. achieved"). Moreover, the contact interface 10 according to the invention, and hence the affixment of the eyes, also offers entirely novel options with regards to autocentration.

Not least, the flap repository 15 offers an integrated solution to a general user problem: In want of a solution that is integrated in the current UVL-LVC systems 50, some users cut their own flap repositories from sterile foam spatulas (or similar materials), which are then moistened and serve as safe and sterile rest for the sensitive flap. However, these may slip or have to be held by other means. Here, use is made of the flap repository 15, which is securely arranged on the end of the contact interface facing the patient's eye 110, for example under the access opening 14. Such a flap repository 15 effectively and reliably closes the above-described gap in a LASIK treatment procedure.

The mentioned disadvantages are solved by the contact interface 10 according to the invention, the UVL-LVC system 50 according to the invention and the contact interface system 1 according to the invention. As already mentioned above, the contact interface system 1 preferably consists of two components: A contact interface adapter 40 with a secure (floating) mount at the laser exit aperture 65 of the application part 60 and an actual contact interface 10 ("disposable", consumable material, new for each patient) with for example a conical design. The contact interface 10 is for example produced from suitable biocompatible material as it comes into direct contact with the patient's eye 110. An appropriately transparent plastic is for example used. By contrast, the contact interface adapter 40 can be produced from one or more materials, for example metal, plastic or Teflon.

An important feature of the contact interface 10 is the access opening 14 for the flap manipulation in its wall 11. This access opening 14 is designed such that releasing and folding ("lifting") of the flap using instruments is rendered possible. As a result, the flap manipulation steps can even be carried out following the placement of the contact interface 10 on, and its suctioning against, the patient's eye 110. Nevertheless, the largely closed cone of the patient interface 10 effectively shields the region above the operation site from the operation surroundings environment (and hence, e.g., preferential flows in the operating region as a result of air-conditioning units are prevented). The access opening 14 is reversibly sealable in one configuration of the contact interface 10; see below.

Figure 5:
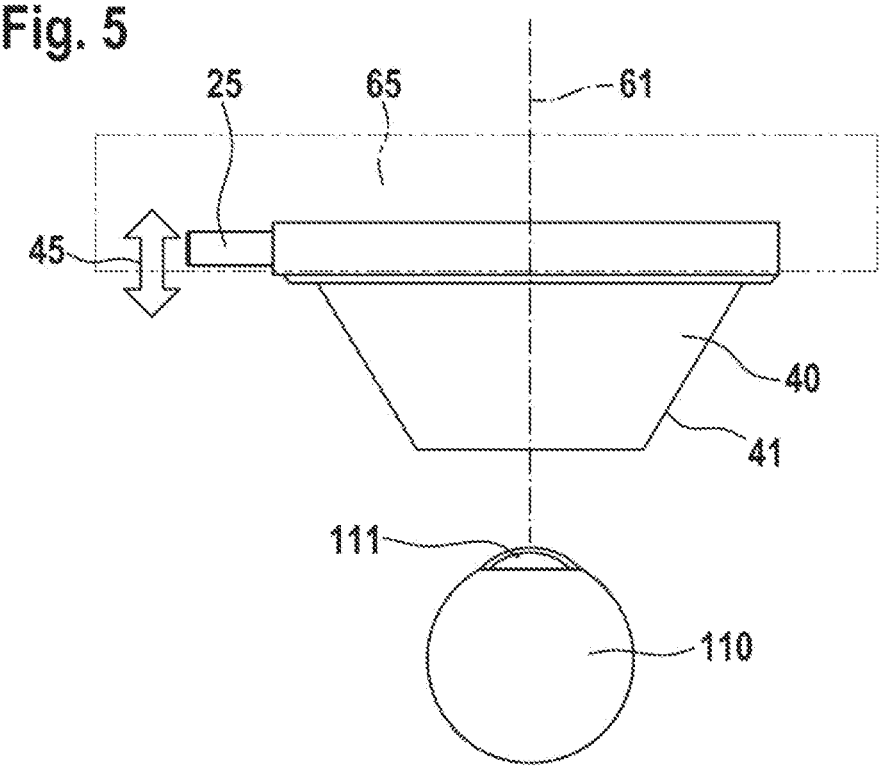
FIG. 5 depicts a contact interface adapter integrated at the laser exit aperture of the application part of the UVL-LVC system.

FIG. 5 shows a contact interface adapter 40 integrated at the laser exit aperture 65 of the application part 60 of the UVL-LVC system 50. The contact interface adapter 40 has a similar conical structure to that of the contact interface 10. However, variations are also possible. Naturally, the contact interface adapter 40 is fastened to be centered with the defined optical axis 190 of the laser exit aperture 65 in the application part 60.

An important feature of this arrangement is that the contact interface adapter 40 has a "floating" mount on the application part 60. This is necessary so that the contact interface 10 is not rigid when placed on the patient's eye 110 but can yield to the placement pressure and can deviate "upwardly" in the positive z-direction. The deviation movement is for example measured by position encoders, and a pressure sensor is likewise for example implemented as well (safety concept). The signals from position encoders and pressure sensor are supplied to the control system of the UVL-LVC system 50 according to the invention, that is to say processed in the control unit of the UVL-LVC system 50 according to the invention. When certain limit values are exceeded, further lowering of the application arm 55, the articulated arm in this case, of the UVL-LVC system 50 according to the invention, that is to say a height adjustment in the z-direction, is interrupted or the system is displaced slightly upwardly. In the case where a patient's eye 110 is attached by suction, the negative pressure for the suction ring 12 is also lifted automatically such that the contact interface 10 detaches from the patient's eye 110.

Figure 6:
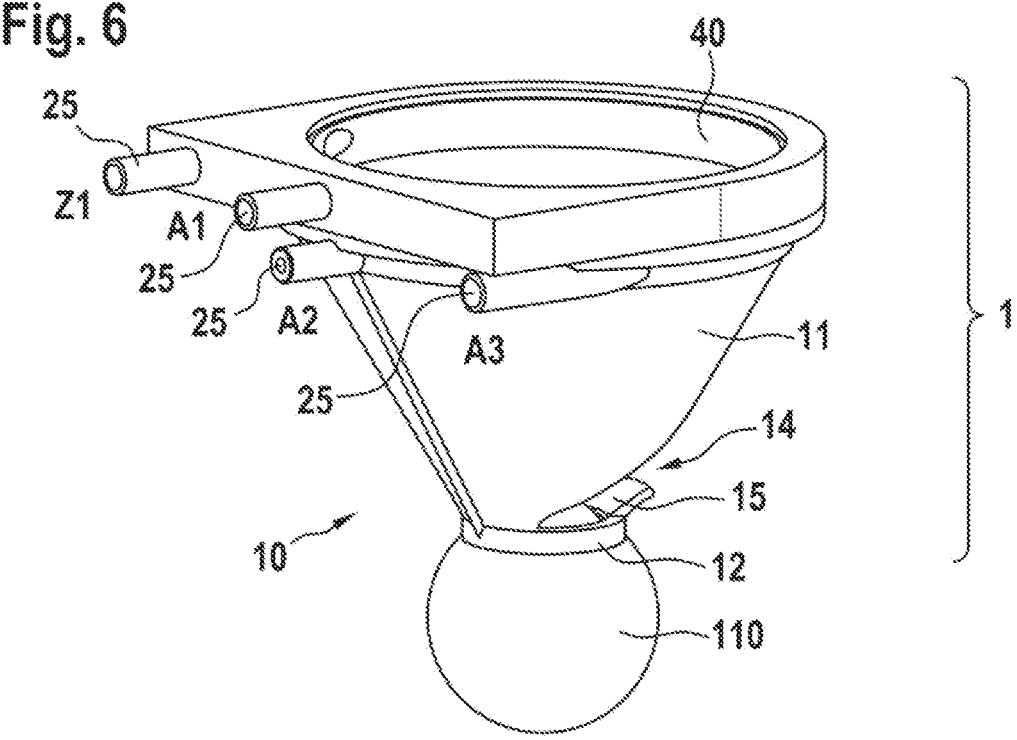
FIG. 6 depicts a second example embodiment of the contact interface system according to the invention with connectors for the supply or aspiration of air or gases.

FIG. 6 depicts a second example embodiment of the contact interface system 1 according to the invention with connectors 25 for the supply or aspiration of air or gases. Here, the connectors 25 of the contact interface system 1, that is to say of the contact interface adapter 40 and the contact interface 20, are described in more detail. In this example embodiment, the contact interface adapter 40 and the contact interface 10 each have two tube connectors.

These are "Z1" and "A1" for the contact interface adapter 40. The tubes (not shown) belonging to these connectors 25 are produced from suitable material and for example run within the application part 60 and into the application arm 55, that is to say the articulated arm, from there, and finally into the base unit 52 of the UVL-LVC system 50 according to the invention which, incidentally, has a mobile configuration, that is to say the UVL-LVC system 50 is easily displaceable—by use of wheels or rollers in this case.

For the contact interface 10, these are the tube connectors 25 "A2" and "A3". The tubes (not shown) to be connected thereto are for example made of bendable and suitable material, which should be biocompatible. These tubes run away from the contact interface 10, to be precise outside of the application part 60 in the patient region.

Together with the contact interface 10 itself, the tubes are for example part of a "disposable kit" for the user and are supplied fully configured in one blister pack per patient's eye 110. The other side of the tube ends are provided with corresponding adapters and are for example provided for the connection to the base unit 52 of the UVL-LVC system 50 according to the invention (not shown). The functional features connected to the tube connectors (and tubes) are explained in more detail on the basis of FIG. 6 and FIG. 7.

Thus, in summary, the following connectors are provided:
Z1: Supply of air
A1: Suctioning the contact interface 10 against the contact interface adapter 40
A2: Suction for negative pressure of the suction ring 12 for affixment to the patient's eye 110
A3: Aspiration in the compartment between contact interface adapter 40 and contact interface 10 ("interstice").

The connector 25 denoted "Z1" in FIG. 6 is thus designed for the supply of air. This air may be cleaned, sterilized, cooled and/or hydrated. The air, appropriately prepared, is supplied under pressure from the base unit 52 of the UVL-LVC system 50 according to the invention by way of the associated tube (see above). This air flows under pressure into the "inflow channel"; see FIG. 7. In terms of gas dynamics, the inflow is designed, for example, in such a way that a cycloidal eddy field ("mini cyclone"; see FIGS. 12 and 13*b*) arises, with the pupil of the patient's eye 110 to be treated being located in the center thereof. What this is intended to achieve is that the debris, that is to say the process waste products, more precisely the ablation (waste) products, are moved as quickly and as effectively as possible from the ablation center to the periphery. In an embodiment variant, another gas with a desired composition is supplied instead of air.

Figure 7:
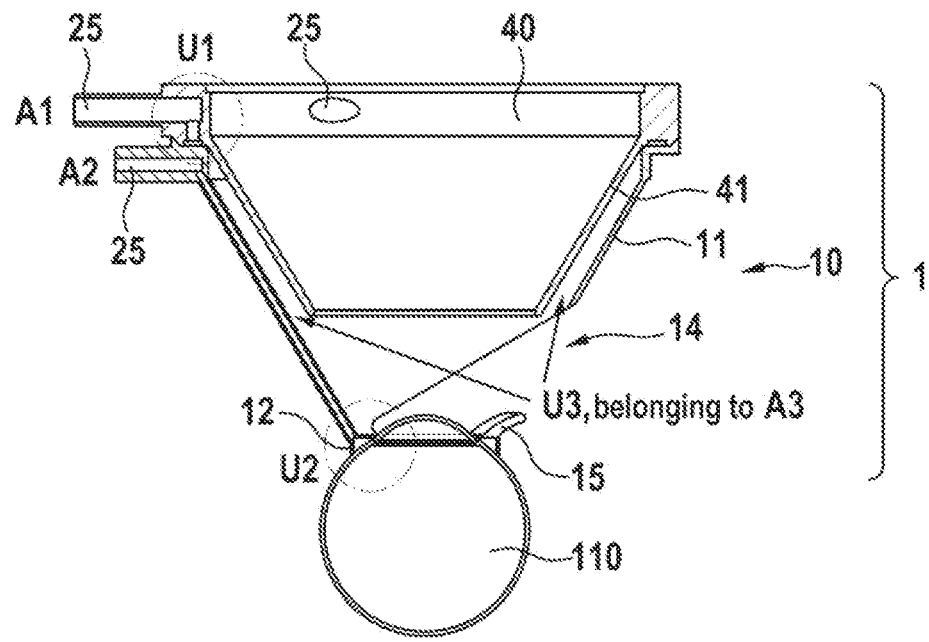
FIG. 7 depicts a third example embodiment of the contact interface system according to the invention made of contact interface adapter and contact interface, with connectors for tube lines and associated functions.

FIG. 7 shows a third example embodiment of the contact interface system 1 according to the invention made of contact interface adapter 40 and contact interface 10, with connectors 25 for tube lines and associated functions, to be precise:
A1: Suctioning the contact interface 10 against the contact interface adapter 40 by producing negative pressure in the rotationally symmetric region U1, which holds the contact interface 10;
A2: Suction for the negative pressure of the suction ring 12 and hence generation of the negative pressure U2 for the affixment of the patient's eye 110;
U3: Negative pressure in the "compartment" for aspirating debris.

By way of the associated tube, negative pressure is generated at the connector 25 "A1" by way of a suitable pump in the base unit 52 of the UVL-LVC system 50 according to the invention. As a result, air is aspirated via the connector 25 "A1", which induces the negative pressure "U1" when the contact interface 10 is placed on (or pushed on) the contact interface adapter 40. This is induced as a result of a self-centered interlock between the contact interface 10 and the contact interface adapter 40, which has a corresponding structural design. In this case, the negative pressure is imparted rotationally symmetrically over the entire curve of the contact interface 10. A special feature is that the contact interface 10 can be rotated relative to the contact interface adapter 40, and hence the application part 60, when suction contact is or has been established. As a result, the user can align the position of the flap repository 15 in accordance with the requirements of the flap for example produced in advance ("hinge position").

Negative pressure produced by a suitable pump in the base unit 52 of the UVL-LVC system 50 according to the invention via the associated tube (see above) is applied to the connector 25 "A2". In a variant, this pump can be the same pump that also produces the negative pressure applied to "A1". The negative pressure "U2" is imparted via the connector 25 "A2" and leads to the suction ring 12 being suctioned against the patient's eye 110. In one variant, the negative pressure at the connector 25 "A2" is controlled by the user, in another variant it is controlled automatically by the control unit of the UVL-LVC system 50 according to the invention within the scope of an autocentration, when the suction ring 12 is located on the patient's eye 110. This now creates a secure connection of the patient's eye 110 to the application part 60 and therefore ultimately to the UVL-LVC system 50 according to the invention. An example configuration of the suction ring 12 is configured to realize suction contact on the transparent cornea 111 and/or in the transition region from the cornea 111 to the sclera (limbus). A configuration provides for an additional, assisting suction contact on the sclera. In a further configuration, the suction ring 12 comprises support facets vis-à-vis the patient's eye 110, that is to say contains a number of individual "suction holes" instead of connected ones to form a continuous "suction groove".

The aforementioned flap repository 15 is an important element. It is intended for the secure and sterile placement of the LASIK flap. Following detachment by the user, the flap is moved in a known manner and safely deposited on the flap repository 15. To this end, the flap repository 15 is for example equipped with a soft and sterile foam layer which can be moistened by the user. The aforementioned rotatability of the contact interface 10 in relation to the contact interface adapter 40 allows the flap repository 15 to be aligned correctly with respect to the current hinge position of the flap.

To ensure the rotatability of the contact interface 10, and hence the alignability of the opening and of the flap repository 15 prior to the start of the operation, that is to say prior to the vision correction by the UV laser treatment, in even easier fashion, the contact interface 10 in one embodiment is not held on the contact interface adapter 40 by the negative pressure but is pushed on the contact interface adapter 40 and mechanically affixed to the contact interface adapter 40 in the desired position (e.g., by way of a spherical catch).

Figure 8:
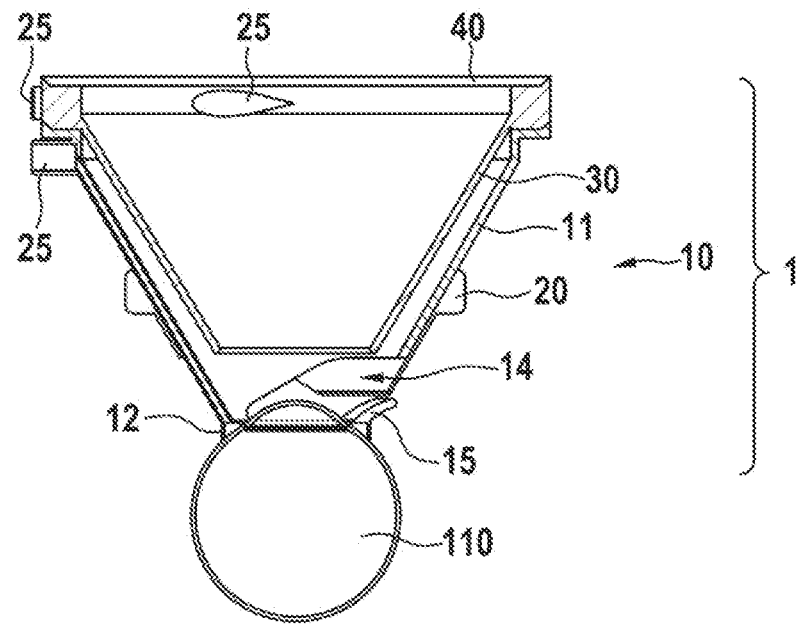
FIG. 8 depicts a fourth example embodiment of the contact interface system according to the invention made of contact interface adapter and contact interface, with a contact interface adapter intermediate wall.

FIG. 8 shows a fourth example embodiment of the contact interface system 1 according to the invention made of contact interface adapter 40 and contact interface 10, with a contact interface adapter intermediate wall 30.

In contrast to the example embodiment in FIG. 7, a negative pressure is produced here for aspirating the debris in an interstice (compartment) between the conical wall 11 of the contact interface 10 and the contact interface adapter intermediate wall 30. This contact interface adapter intermediate wall 30, which is placed directly on the conical wall 41 of the contact interface adapter 40, is part of the single-use contact interface 10, that is to say replaced by a new contact interface for each treatment of a patient's eye 110 and subsequently disposed of. This prevents process waste products from being able to be deposited on the conical wall 41 of the contact interface adapter 40 during the aspiration—said conical wall 41 is of course not replaced after each treatment of a patient's eye 110 and would otherwise have to be cleaned where necessary.

Moreover, this example embodiment discloses a cover element 20 for sealing the access opening 14 in the conical wall 11 of the contact interface 10 during a treatment of the patient's eye 110 using the UVL-LVC system 50, which naturally can also be used in a similar form in a contact interface system 1 as shown in FIG. 7—this cover element 20 is not dependent on the presence of a contact interface adapter intermediate wall 30.

However, all other parts and functions correspond to those of the example embodiment in FIG. 7.

Figure 9:
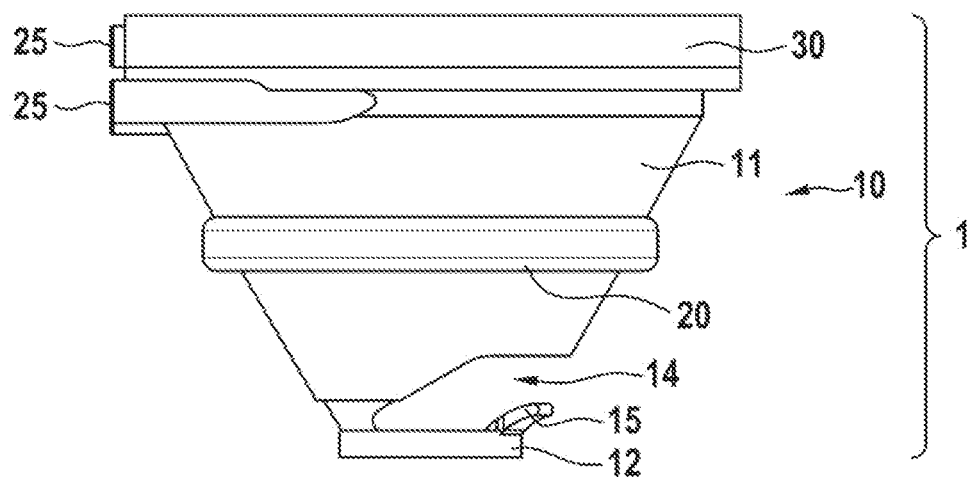
FIG. 9 depicts an example embodiment of the contact interface according to the invention with a contact interface adapter intermediate wall and a cover element.
Figure 10:
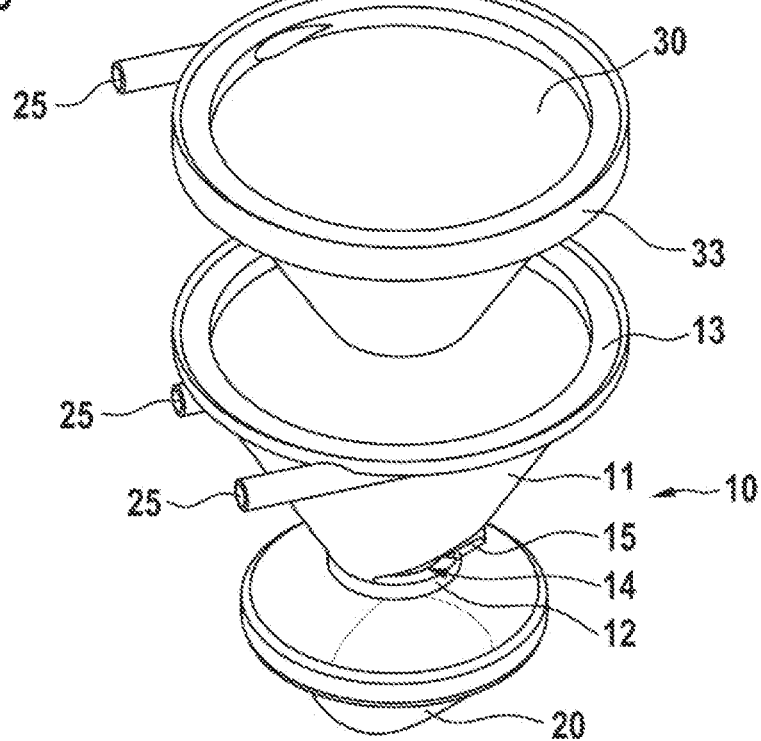
FIG. 10 depicts individual parts of the example embodiment of the contact interface according to the invention with a contact interface adapter intermediate wall and a cover element.

FIG. 9 shows an example embodiment of the contact interface 10 according to the invention with a contact interface adapter intermediate wall 30 and a cover element 20. FIG. 10 then depicts the individual parts of the exemplary embodiment of the contact interface 10 according to the invention with a contact interface adapter intermediate wall 30 and a cover element 20.

In this case, the contact interface 10 is planned as a three-part disposable product, with two parts—the contact interface and the contact interface adapter intermediate wall 40—being adhesively bonded to one another (blue parts) by way of the edge element 13 of the conical wall 11 of the contact interface 10 and the edge element 41 of the contact interface adapter intermediate wall 40, and one part—the cover element 20—being fastened by way of a clip mechanism (gray part). This cover element 20 serves to seal the access opening 14 in the conical wall 11 of the contact interface 10 during the treatment of a patient's eye 110 using the UVL-LVC system 50.

Thus, the conical wall 11 of the contact interface 10 and the contact interface adapter intermediate wall 40 form a double-walled concept of a contact interface 10, for protecting the contact interface adapter 40 against the deposition of process waste products during the aspiration.

In this context, a protection glass situated at the docking site to the contact interface 10 is moreover optionally provided for the purposes of protecting the equipment optical unit. This (expensive) protection glass is part of the application part 60 (situated at the laser exit aperture 65) and is regularly cleaned or optionally replaced within the scope of maintenance.

Figure 11A:
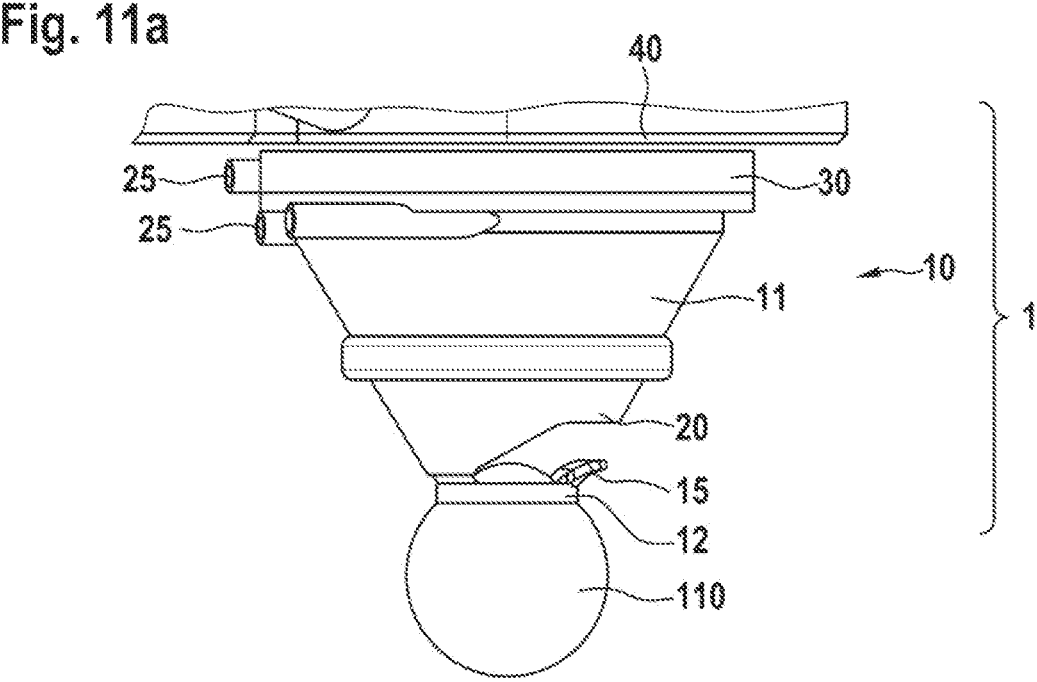
FIGS. 11a and 11b depict a fifth example embodiment of a contact interface system according to the invention with a cover element in an open and a closed state on a patient's eye.
Figure 11B:
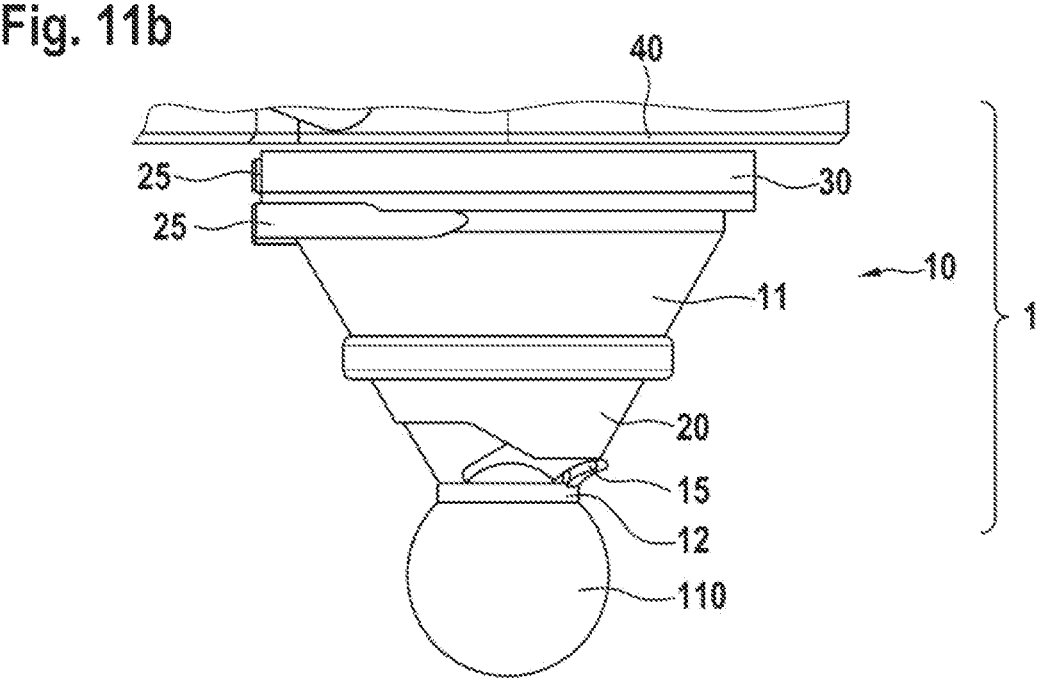

FIGS. 11a and 11b depict a fifth example embodiment of a contact interface system 1 according to the invention with a cover element 20 in an open and a closed state on a patient's eye 110 (The parts and functions not described here correspond to those of the previous examples).

In the open state as shown in FIG. 11a, the cover element 20, which was brought into a second position on the outer side of the conical wall 11 of the contact interface 10 by rotation, opens up an access opening 14 in the conical wall 11 of the contact interface 10 and the cornea 111 of the patient's eye 110 to be treated can be manipulated by the surgeon without the contact interface 10 having to be detached from the patient's eye 110. In particular, a flap can be opened in the corneal surface and can be placed on the flap repository 15.

In the closed state as depicted in FIG. 11b, the cover element 20, which was brought into a first position on the outer side of the conical wall 11 of the contact interface 10 by rotation, covers the access opening 14 in the conical wall 11 of the contact interface 10. Hence, the cornea 111 of the patient's eye 110 can be processed in homogeneous fashion by application of the UVL-LVC system 50.

Figure 12:
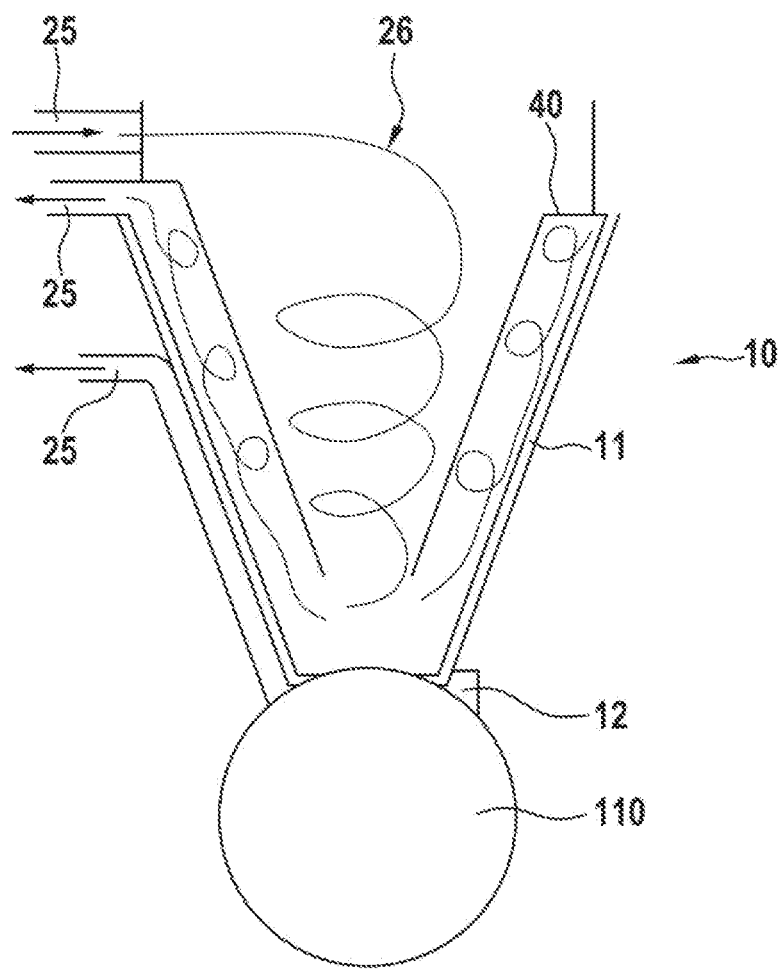
FIG. 12 depicts the representation of gas dynamics with a cycloidal flow profile in a sixth example embodiment of a contact interface system according to the invention.

FIG. 12 sketches out the representation of gas dynamics with a cycloidal flow profile ("mini cyclone") in a sixth example embodiment of a contact interface system 1 according to the invention.

A particular feature of the gas dynamics is the fact that the "eye of the cyclone" is situated over the pupil region of the patient's eye 110, and so there is little airflow in this region of the cornea 111 of the patient's eye 110 which could dry the latter out. This air is effectively removed by way of the negative pressure "U3" (see FIG. 7) in the "compartment" between the contact interface 10 and the contact interface adapter 40. The arrangement is three-dimensional and therefore the compartment extends over the entire interstice between the contact interface adapter 40 and contact interface 10 (or between the contact interface adapter intermediate wall 30 and contact interface 10 if a contact interface system 1 as shown in FIGS. 8 to 10 is used). The aspiration induced by way of the connector 25 "A3", which leads to the negative pressure "U3", serves to remove the debris-contaminated air. The aspirated air is guided by the tubes (see above) to the base unit 52 of the UVL-LVC system 50 according to the invention and is filtered there in suitable fashion to prevent a biohazard in the environment.

In a further embodiment, the direction of the airflow can also be designed in the reverse direction. That is to say, the inlet of the airflow is arranged close to the patient's eye 110 and the aspiration is at the objective-facing end of the contact element 10. This embodiment is advantageous in terms of three essential aspects: Firstly, an intended hydration and cooling effect for the cornea 111 of the patient's eye 110 is achieved more directly by the controlled inlet air since the tissue to be controlled is situated close to the inlet. Moreover, the kinetic energy of the plume particles is thus used to transport the waste material of the ablation (that is to say the process waste products) onward in the direction of the flow; the particles need not be slowed down before they are transported in the direction of the outlet.

Thirdly, these ablation products are no longer transported in the direction of the cornea 111 of the patient's eye 110, where they could accumulate again.

Figure 13A:
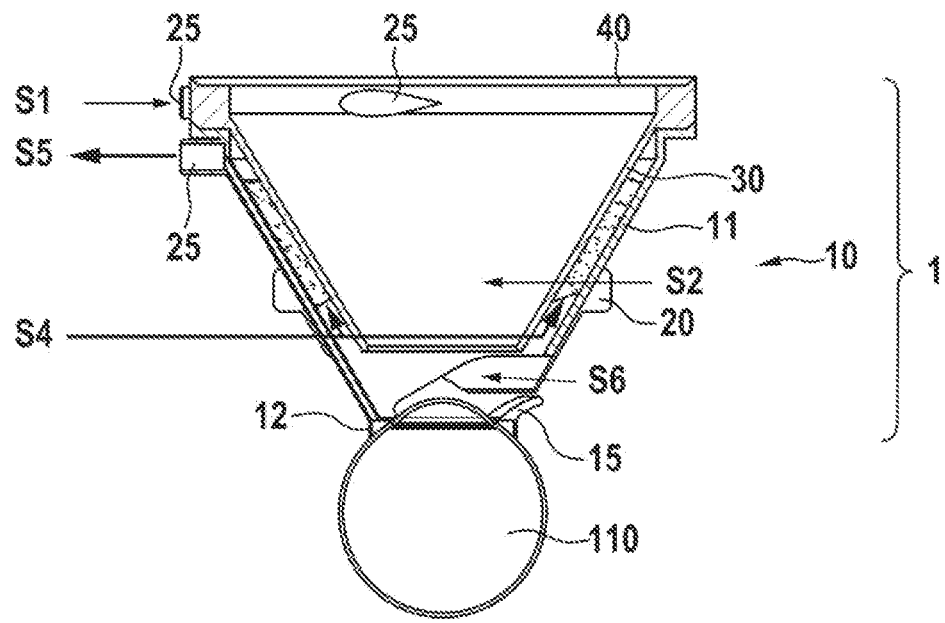
FIGS. 13a and 13b depict the representation of gas dynamics with a cycloidal flow profile in a seventh example embodiment of a contact interface system according to the invention.
Figure 13B:
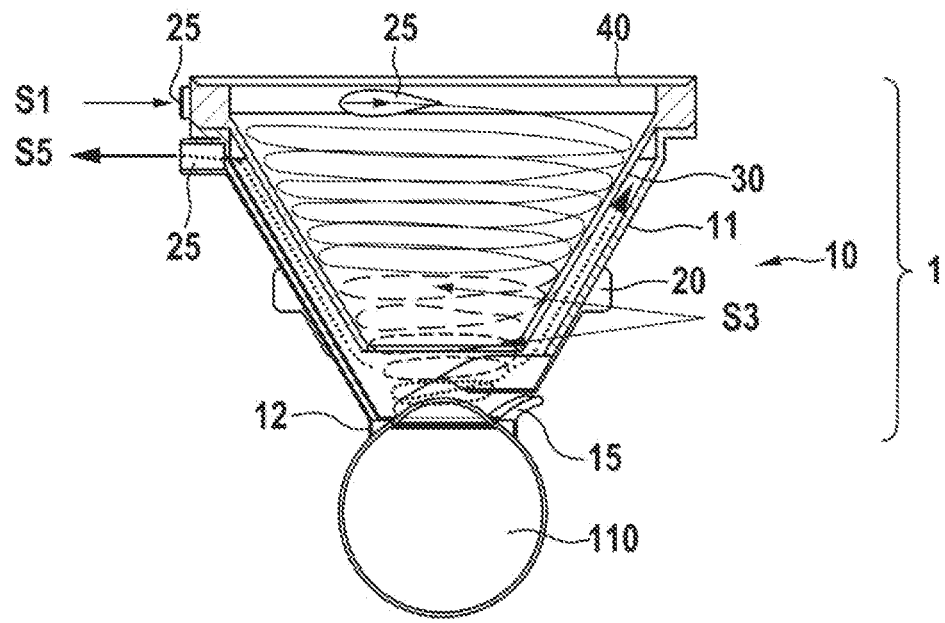

FIGS. 13*a* and 13*b* depict gas dynamics with a cycloidal flow profile in a seventh example embodiment of a contact interface system 1 according to the invention made of contact interface adapter 40 and contact interface 10 with a contact interface adapter intermediate wall 30.

Appropriate arrows show the essential supply and removal paths of air or gas, and the movement thereof within the contact interface system 1, and the associated pressure conditions.

S1 denotes the supply of cleaned, cooled and hydrated air or gas into the interior of the contact interface system 1 through a connector 25 at the contact interface adapter 40. A "mini cyclone" S3 is produced in the interior of the contact interface system 1 by a slight positive pressure S2 in the interior of the contact interface system (and in conjunction with the aspiration S5) and said mini cyclone approaches the cornea 111 of the patient's eye 110 from above. Slight negative pressure and hence a slight vacuum S4 is produced as a result of the aspiration of warm and contaminated air or gas (debris) S5 in the interstice ("compartment") between conical wall 11 of the contact interface 10 and contact interface adapter intermediate wall 30, which rests directly against the cone of the contact interface adapter 40. This aspiration and hence the removal of the process waste products is thus implemented via a virtually rotationally symmetric space between conical wall 11 of the contact interface 10 and contact interface adapter 40 or the contact interface adapter intermediate wall 30 resting on the contact interface adapter 40. As a result, this leads to stable temperature, pressure, air or gas purity and moisture conditions on the cornea 111 of the patient's eye 110 at the location of the treatment activity S6. In this case, the mini cyclone causes the process waste products (debris) to be pressed to the outside by the centrifugal rotational movements, from where they are aspirated via the above-described interstice.

Such a flow profile establishes an important equilibrium between air or gas supply and aspiration and effectively guarantees the prevention of a loss of air or gas through the access opening 14 in the conical wall 11 of the contact interface 10, which is almost fully sealed by a cover element 20 during the processing of the patient's eye 110 by way of the UVL-LVC system 50 in this example embodiment, and the process waste products (debris) are effectively removed at the same time.

Figure 14A:
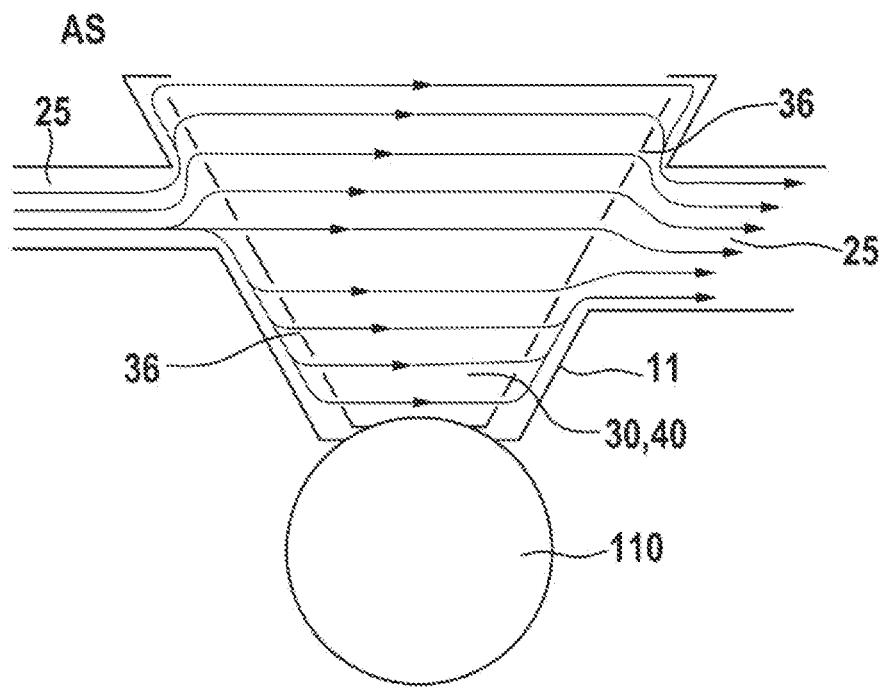
FIGS. 14a and 14b depict the representation of alternative gas dynamics with a flow profile parallel to the cornea of the patient's eye in an eighth example embodiment of a contact interface system according to the invention.
Figure 14B:
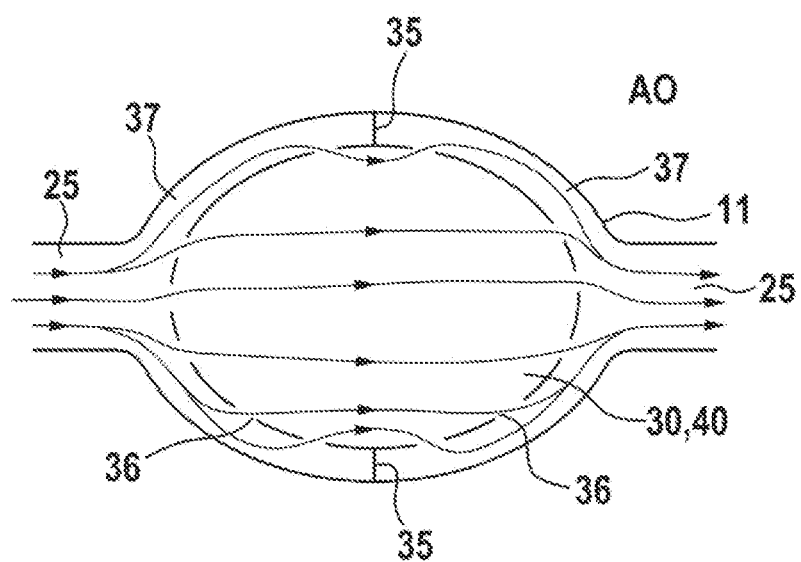

FIGS. 14*a* and 14*b* represent alternative gas dynamics with a flow profile parallel to the cornea 111 of the patient's eye 110 in an eighth example embodiment of a contact interface system 1 according to the invention, with FIG. 14*a* showing this in a side view (SA) and FIG. 14*b* showing this in a view from above (AO).

Here, a double-walled funnel for implementing a horizontal laminar flow can be identified in the view from above, which funnel is formed between the conical wall 11 of the contact interface 10 and the contact interface adapter intermediate wall 30 or the contact interface adapter 40. Situated between these two there are two chamber partition walls 35 that may extend over the entire height of the contact interface 10 and that are arranged on opposite sides of the double-walled funnel. This forms two chambers 37, one of which is used for the inflow and the other of which is used for the aspiration, of air or any other gas, by way of appropriate connectors 25 at the chambers 37.

Thus, a funnel through which there is a laminar flow perpendicular to the optical axis 190 is formed in this example embodiment of a contact interface system 1. The air is brought into the double-walled funnel by way of a supply line 25. On its inner side, that is to say for example in the contact interface adapter intermediate wall should the latter be used (with an appropriately adapted, generally substantially shorter contact interface adapter) or else in the contact interface adapter 40, this double-walled funnel for example has perforations 36 at suitable intervals over at least some of these surfaces. The chamber partition walls 35 partition the funnel into two symmetrical halves—that is to say into two chambers 37. Positive pressure is built up in the first chamber 37, by operation of which the air or the gas flows in, while negative pressure is produced in the second, opposite chamber 37. A uniform flow pattern can be generated by choosing the perforation dimensions and the spacing of the perforations 36.

The advantage of such an embodiment is a laminar airflow which effectively removes the debris without generating zones with particle accumulation in eddies. In this case, the removal is implemented substantially perpendicular to the propagation direction of the plume and the propagation direction of the ablation laser, as a result of which contamination is quickly and efficiently removed from the ablation zone.

In this embodiment, the region of the instrument access, that is to say the access opening 14, in the conical wall 11 of the contact interface 10 is intended to be located in the region of one of the chamber partition walls 35, that is to say between supply and removal lines, since the flow field flows approximately tangentially to the funnel wall and the cover of the instrument access hardly introduces turbulence here.

In a further embodiment variant, the number and the diameters of the perforations 36 are adjusted in order to realize a stronger airflow in certain areas. These areas are for example adapted to the propagation of the plume such that accumulations of process waste products are effectively avoided or such that, alternatively or in addition, the tissue temperatures and the hydration in the region of the corneal surface of the patient's eye 110 are controlled by application of the supplied air.

What should be stated very generally with regards to the flow conditions and pressure profiles is that the flow speed perpendicular to the plume propagation should be more than 2.5 m/s, for example 5 m/s and in another example greater than 10 m/s in the ablation zone.

The volumetric flow rate should be in the range of 2.5 to 10 l/s (corresponding to 10 m/s). In the embodiment as a funnel through which a laminar horizontal flow passes, this means a pressure application of 10 to 20 mbar in the supply line; the application of pressure should be even higher in embodiments where the intention is to generate a "mini cyclone" since more friction is generated in these embodiments.

On account of the expected pressure loss over the course of pipelines, tubes or supply lines with diameters of approximately >20 mm are optionally used for the transportation of air.

The aforementioned features of the invention, which are explained in various example embodiments, can be used not only in the combinations specified in an example manner but also in other combinations or on their own, without departing from the scope of the present invention.

A description of a piece of equipment relating to method features is analogously applicable to the corresponding method with respect to these features, while method features correspondingly represent functional features of the equipment described.

The invention claimed is:

1. A UV laser-based system for vision correction (UVL-LVC system) which comprises a base unit and an application arm with, at a distal end thereof, an application part with a laser exit aperture, the UV laser-based system comprising:
   a UV laser source which emits continuous or pulsed laser radiation;
   a scanning system that laterally scans the laser radiation in x- and y-directions, or in the x- and y-directions and also perpendicular thereto in a z-direction;
   a control unit;
   an imaging optical unit that focuses the laser radiation on a cornea of a patient's eye;
   a contact interface adapter that is arranged on the application part, an axis of said contact interface adapter running coaxially with an optical axis of the application part at the laser exit aperture of the application part;
   the contact interface adapter being configured to accommodate a contact interface such that the contact interface is rotatable and affixable in relation to the contact interface adapter;
   wherein the imaging optical unit further comprises a microscope optical unit that focuses the laser radiation on the cornea of the patient's eye, an optical opening of which is configured such that an acceptance angle $xx_{Max}$ for reflections detectable by the UVL-LVC system is selected from a group consisting of greater than 15°, greater than 25°, and greater than or equal to 37°; and
   further wherein the optical opening is selected from a group consisting of greater than 50 mm, and greater than or equal to 60 mm, and has a working distance selected from a group consisting of less than 50 mm, and less than or equal to 40 mm.

2. The UVL-LVC system as claimed in claim 1, wherein the contact interface adapter further comprises a floating mount in the application part of the application arm or further comprises the floating mount configured as an articulated arm.

3. The UVL-LVC system as claimed in claim 1, further comprising a pressure sensor, a position encoder or both, between the contact interface adapter and the application part.

4. The UVL-LVC system as claimed in claim 1, further comprising a transparent protection element behind the laser exit aperture in the application part of the application arm or a protection glass behind the laser exit aperture in the application part of the application arm.

5. The UVL-LVC system as claimed in claim 1, configured to accommodate a contact interface that positions and affixes a patient's eye on the UVL-LVC system, comprising a conical wall and a suction ring configured for suction contact with the patient's eye by application of negative pressure but not comprising any optical element or not comprising any lens element; or
   a contact interface system that positions and affixes a patient's eye on the UVL-LVC system, comprising:
   a conical wall and a suction ring that facilitates suction contact with the patient's eye by application of negative pressure but not comprising any optical element or not comprising any lens element;
   the contact interface adapter being arrangeable on an application part of the application arm of the UVL-LVC system with a laser exit aperture such that an axis of the contact interface adapter runs coaxially with the optical axis of the application part at the application part's laser exit aperture;
   the contact interface being placeable over the patient's eye and being affixable thereto, and the contact interface being rotatable and affixable in relation to the contact interface adapter; or both.

* * * * *